United States Patent
Sharma et al.

(10) Patent No.: US 8,207,845 B2
(45) Date of Patent: Jun. 26, 2012

(54) ALARM SYSTEM PROVIDING WIRELESS VOICE COMMUNICATION

(75) Inventors: Raman Kumar Sharma, Toronto (CA); Francisco Bogarin, North York (CA)

(73) Assignee: Tyco Safety Products Canada Ltd., Concord, Ontario (CA)

( * ) Notice: Subject to any disclaimer, the term of this patent is extended or adjusted under 35 U.S.C. 154(b) by 216 days.

(21) Appl. No.: 12/172,410

(22) Filed: Jul. 14, 2008

(65) Prior Publication Data

US 2010/0007488 A1    Jan. 14, 2010

(51) Int. Cl.
- *G08B 1/08* (2006.01)
- *G08B 1/00* (2006.01)
- *G08B 13/08* (2006.01)
- *H04M 11/04* (2006.01)

(52) U.S. Cl. ............ 340/539.14; 340/539.17; 340/531; 340/545.9; 455/404.1; 379/37

(58) Field of Classification Search ............ 340/539.14, 340/539.17; 455/404.1
See application file for complete search history.

(56) References Cited

U.S. PATENT DOCUMENTS

| | | | |
|---|---|---|---|
| 4,868,859 A | 9/1989 | Sheffer | |
| 5,517,547 A | 5/1996 | Ladha et al. | |
| 5,850,180 A | 12/1998 | Hess | |
| 7,225,037 B2* | 5/2007 | Shani | 700/18 |
| 2004/0017824 A1* | 1/2004 | Koenck et al. | 370/466 |
| 2004/0041910 A1* | 3/2004 | Naidoo et al. | 348/156 |
| 2005/0174229 A1* | 8/2005 | Feldkamp et al. | 340/506 |
| 2009/0323904 A1* | 12/2009 | Shapiro et al. | 379/39 |
| 2010/0030856 A1* | 2/2010 | Blum et al. | 709/206 |

FOREIGN PATENT DOCUMENTS

WO    WO 00/75900 A1    12/2000

* cited by examiner

*Primary Examiner* — George Bugg
*Assistant Examiner* — Jack Wang
(74) *Attorney, Agent, or Firm* — Smart & Biggar

(57) ABSTRACT

An alarm system includes one or more audio stations, and an audio station network interface. The audio stations communicate wirelessly with the audio station network interface. The audio station network interface communicates with a monitoring center over a cellular network, to allow audio monitoring of the premises at the audio stations. The audio station network interface may be called by the monitoring center. Calls may optionally be placed by it in response to user interaction with one of the audio stations.

10 Claims, 2 Drawing Sheets

ALARM SYSTEM PROVIDING WIRELESS VOICE COMMUNICATION

FIELD OF THE INVENTION

The present invention relates generally to alarm systems, and more particularly to alarm systems that allow voice communication with a monitoring center.

BACKGROUND OF THE INVENTION

Home and business alarms have become commonplace. Such alarms (often referred to as "security systems" or "alarm systems") typically include several sensors used to monitor unauthorized entry and other conditions at monitored premises, such as fire, smoke, toxic gases, high/low temperature (e.g. freezing) or flooding, at a premises. In response to sensing an alarm condition, one or more of these sensors provides a signal to an alarm panel that in turn may sound and notify the occurrence of the alarm to occupants of the premises and remotely signal a monitoring station or other third party.

Typically the occurrence of an alarm is signaled to a remote monitoring station that may then dispatch capable authorities to intervene at the premises. For example, in the case of sensing an unauthorized entry to the premises, the monitoring station may dispatch security personnel, typically in the form of private security guards or police officers.

In addition to monitoring and signaling certain alarm conditions, live voice communication with the monitored premises may be desirable. In this way, intruders may be scared off, and occupants may be guided or assisted. Live voice communication, however, typically requires a dedicated wired connection to a monitoring station, or prolonged use of the premises telephone line, preventing an occupant from calling others, such as the police, friends or relatives.

Further, conventional alarm systems that allow voice communication typically do so through a central panel, capable of otherwise signaling sensed alarms. As such, upgrading existing alarm systems typically requires the replacement of the panel.

Accordingly there is a need for alarm systems that allow voice communications with a monitoring center, possibly by way of addition or retrofit.

SUMMARY OF THE INVENTION

Exemplary of embodiments of the present invention, an alarm system includes one or more audio stations, and an audio station network interface. The audio stations communicate wirelessly with the audio station network interface. The audio station network interface communicates with a monitoring center over a cellular network, to allow audio monitoring of the premises at the audio stations. The audio station network interface may be called by the monitoring center. Calls may optionally be placed by it in response to user interaction with one of the audio stations.

In accordance with an aspect of the present invention, a method of processing an alarm at a premises, comprises: sensing the alarm at a premises; signaling the alarm from the premises to a monitoring center; from the monitoring center establishing a cellular network call to a network to audio monitoring station interface at a cellular network address, at the premises; establishing a radio channel from the network to audio monitoring station interface to at least one audio station at the premises, the audio station comprising at least one of speaker and a microphone, and bridging the radio channel to the cellular network call to establish an audio channel from the at least one audio interface to the monitoring center.

In accordance with another aspect of the present invention, an alarm system at a monitored premises, comprises: a control panel; a plurality of sensors in communication with the control panel, each of the sensors for sensing a monitored alarm condition; a plurality of audio stations, each of the audio stations comprising at least one of a speaker and a microphone; and a radio transceiver; an audio station network interface, comprising a radio for communicating with a cellular communications network; and a radio transceiver for establishing a radio channel with at least one of the plurality of audio stations, the radio transceiver and the radio interconnected to bridge the radio channel to a call over the cellular communications network.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1:
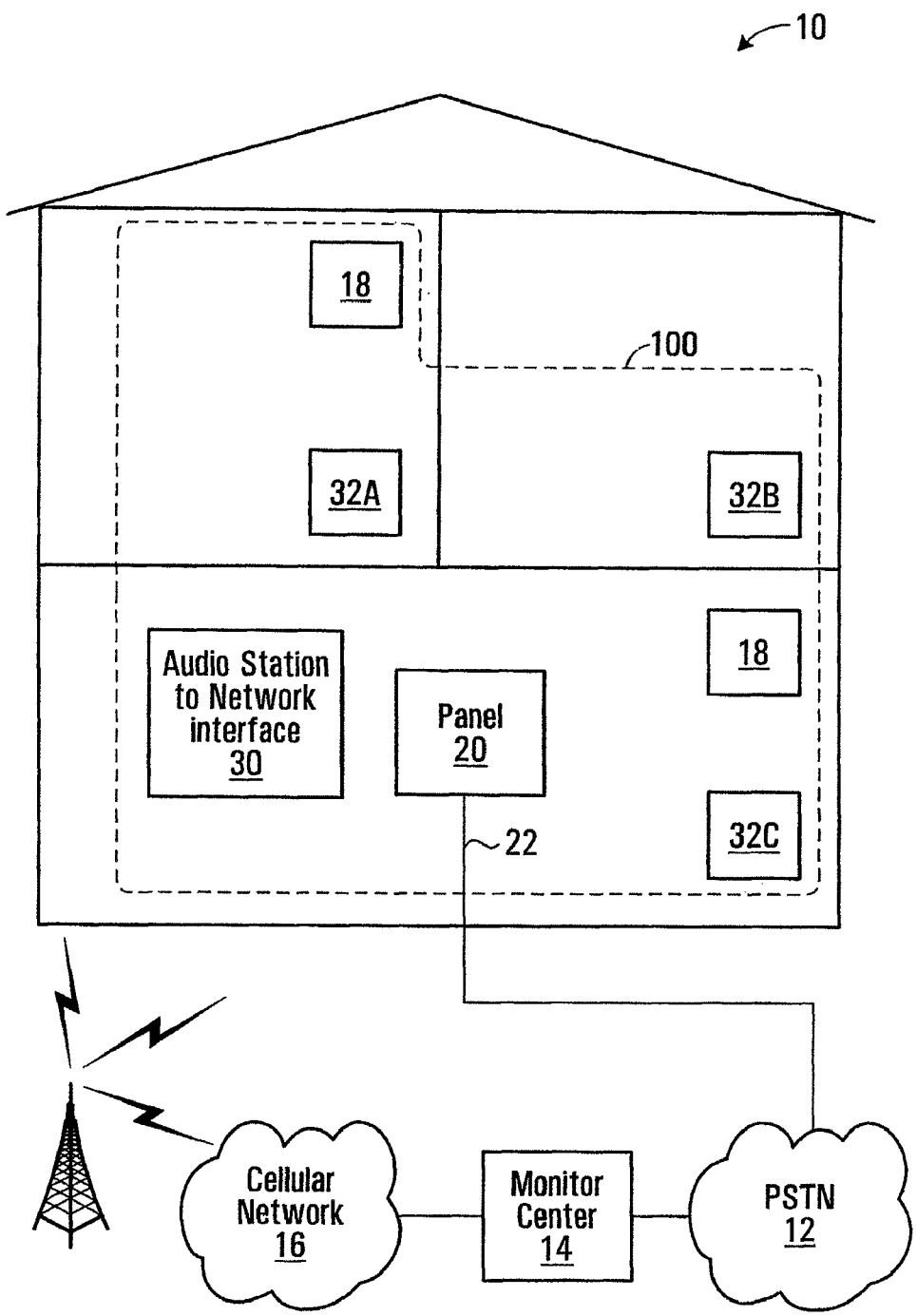
FIG. 1 is a schematic diagram of an alarm system at a monitored premises, exemplary of an embodiment of the present invention.
Figure 2:
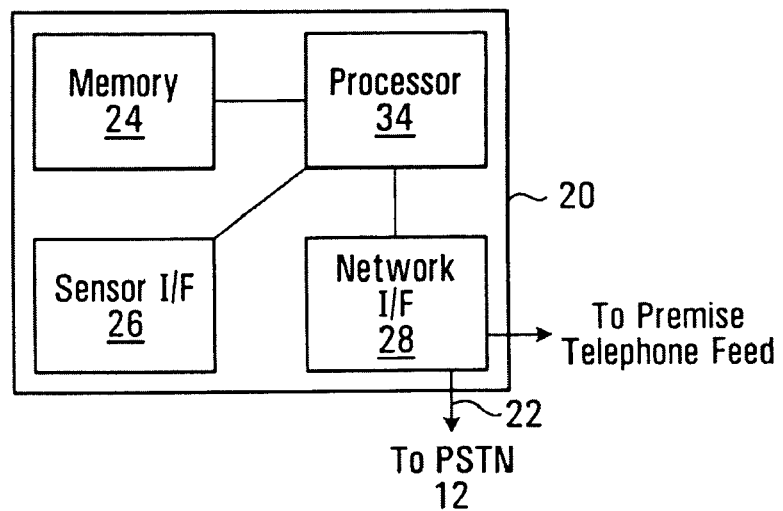
FIG. 2 is a schematic block diagram of an alarm panel of the system of FIG. 1.

FIG. 1 depicts a residential or business premises 10 guarded by an alarm system 100 including panel 20 in communication with a plurality of sensors 18. Panel 20 of FIG. 1 is schematically depicted in FIG. 2.

Sensors 18 may be entry sensors, flood sensors, motion detectors, smoke detectors, glass breakage sensors, or any other sensors to be monitored, as appreciated by those of ordinary skill. Sensors 18 may also include user interface sensors/panels. Sensors 18 may be in communication with panel 20, wirelessly, by a wired interconnect, through the electric wiring of premises 10, or otherwise. The alarm system may further include other interfaces such as key pads, sirens, and the like, not specifically illustrated in FIG. 1.

Panel 20 is further interconnected with a conventional telephone network. In the depicted embodiment, panel 20 is interconnected with the public switched telephone network (the PSTN) 12 and may be in communication with one or more other communication network(s), through a network interface module 28. Alternatively, or additionally panel 20 may be interconnected with network 16 in the form of a cellular telephone network that carries both voice and data. Cellular network 16 may, for example, be a GPRS/GSM cellular network, and as such be considered a GSM network and GPRS network. As will become apparent, panel 20 could instead or additionally be in communication with some other network such as a wide area wireless data network, a wired data network such as the internet, or the like.

A monitoring center 14 is in communication with PSTN 12 and cellular network 16. Monitoring center 14 is depicted as a single monitoring center in FIG. 1. Monitoring center 14 could be formed of multiple monitoring stations, each at different physical locations. For example, some monitoring stations could be in communication with network 16, others with in communication with PSTN 12. Monitoring center 14 is associated with a plurality of PSTN telephone numbers, and optionally other network addresses, such as a cellular network or data address, that may be used to contact monitoring center 14 to provide data indicative of a monitored event, at a monitored alarm system, such as the alarm system including panel 20 at premises 10. Typically, monitoring center 14 is manned with personnel, equipped to respond to a signaled alarm and able to dispatch emergency personnel, such as security personnel, the police, fire department or the like.

Exemplary of an embodiment of the present invention, alarm system 100, further includes a plurality of audio stations 32a, 32b, 32c . . . (individually, and collectively audio station(s) 32) and an audio station network interface 30. In the depicted embodiment, audio stations 32 are each wirelessly in communication with audio station network interface 30, over a uni-, or bi-directional radio channel. Audio stations 32 may be placed throughout premises 10, at locations convenient to occupants at premises 10. As will become apparent, audio station network interface 30 bridges the one or more radio channels of audio station network interface 30 to a monitoring station to allow voice communication from a monitoring center, such as monitoring center 14, to premises 10 in case of an alarm, or otherwise, over cellular network 16.

Example alarm panel 20 is more particularly illustrated in FIG. 2. As illustrated, alarm panel 20 includes a central processor 34 in communication with memory 24 and a sensor interface 26. A network interface 28 is further in communication with processor 34. Network interface 28 is interconnected with telephone feed for the remainder of premises 10 and provides an output at tip and ring lines of network interface 28. For example, tip and ring lines are typically suited for interconnection with PSTN 12. However, tip and ring lines of interface 28 could feed a network interface module that is in communication with several networks including PSTN 12 and cellular network 16, as for example detailed in U.S. patent application Ser. No. 11/728,478, the contents of which are hereby incorporated by reference. Software controlling overall operation of panel 20, and hence system 100 may be loaded in memory 24. Sensor interface 26 may communicate with sensors 18 by wires, wirelessly, over electrical wiring, or otherwise. Panel 20 may further include conventional components (not shown), such as a power supply, antennal, and the like.

Figure 3:
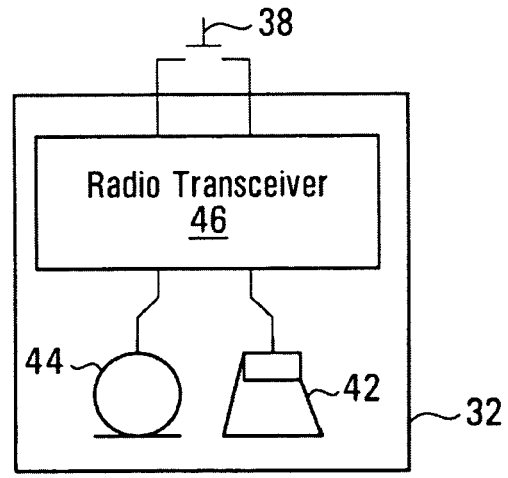
FIG. 3 is a schematic block diagram of an audio station of the alarm system of FIG. 1.

An example audio station 32 is schematically depicted in FIG. 3. As illustrated audio station 32 includes one or more audio transducers—in the form of a speaker 42 and a microphone 44, interconnected with a radio transceiver 46. Radio transceiver 46 may take the form of a conventional cordless telephone transceiver, and may for example take the form of a spread-spectrum radio transceiver operating at 900 MHz, 2.4 GHz; 5.8 GHz; or the like. Radio transceiver 46 may for example be formed as a single integrated circuit available from Broadcomm, Texas Instruments and Freescale or others. Radio transceiver 46 may be addressable and operate on a unique frequency, allowing concurrent operation of multiple radio transceivers (and thus multiple audio stations 32). Audio station 32 may also include a switch 38, that may be actuated by an occupant to activate radio transceiver 46. Once activated, radio transceiver 46 may attempt to establish a radio channel to a complementary transceiver (detailed below). Audio station 32 may further include conventional components (not shown), such as a power supply (in the form of an AC power supply, battery, or the like), an antenna, and the like.

As well, radio transceiver 46 may include control logic to receive and respond to a unique radio control signal, that once received may cause radio transceiver 46 to activate speaker 42 and microphone 44 and establish a link to a complementary transceiver. Alternatively, radio transceiver 46 may also include control logic to activate a coder/decoder (codec) which in turn may activate speaker 42 and microphone 44.

Figure 4:
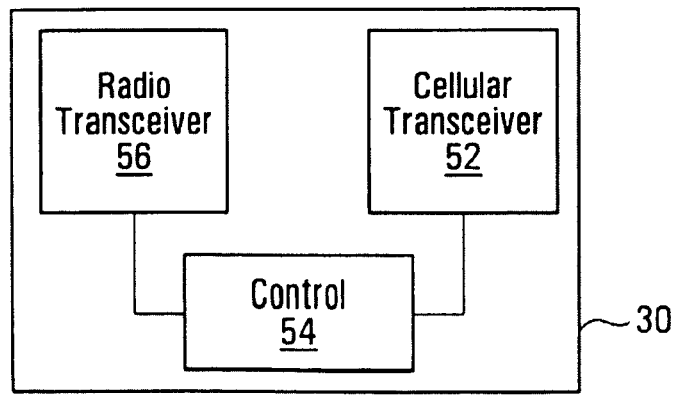
FIG. 4 is a schematic block diagram of an audio station network interface of the alarm system of FIG. 1.

Example audio station network interface 30 is schematically depicted in FIG. 4. As illustrated, audio station network interface 30 includes a cellular network transceiver 52—for example in the form of a conventional GSM or CDMA cellular network radio transceiver, able to establish and receive conventional cellular network calls over cellular telephone network 16 (FIG. 1). Optionally, cellular network transceiver 52 is further capable of receiving and transmitting cellular network data. To this end, cellular network transceiver 52 may be a combined GSM/GPRS radio transceiver, a CDMA 1x transceiver, or the like. Cellular network transceiver 52 may be formed as a single integrated be circuit or module, as for example made available by Motorola in the form of G24E GSM/GPRS module. Transceiver 52 accordingly is addressable over cellular network 16, by way of its own telephone number, International Mobile Equipment Identity (IMEI), or similar network identifier. Control logic 54 of cellular network transceiver 52 provides control signals in response to receiving an incoming cellular network call, or received digital data over network 16. Again, audio station network interface 30 may further include conventional components (not shown), such as a power supply, antennal, and the like.

Audio station network interface 30 also includes a local radio transceiver 56, complementary to radio transceiver 46 of each audio station 32. Radio transceiver 46/56 may be similar to a radio such as the CC2511 offered by Texas Instruments. Radio transceiver 46/56 may also include control logic in the form of a microcontroller, such as a Freescale MC9S08GT16. Radio transceiver 56 may establish a radio channel local within premises 10 and provide and receive audio signals to transceiver 46 of each of audio stations 32. Conveniently, local radio transceiver 56 may establish multiple independent radio channels—one to each of the multiple audio transceivers 46 at premises 10—concurrently. Control signals from control logic 54 may cause radio transceiver 56 to selectively address and establish radio links to audio stations 32. For example, suitable GPRS network control signal (s) from monitoring center 14 to network to audio station 30 may cause audio station to network interface 30 to activate one or more of audio stations 32. Any suitable addressing technique from radio transceiver 56 to any one of transceiver 46 may be used.

Audio signals from wireless radio transceiver 56 may be provided to cellular radio transceiver 52 and thus to cellular network 16, over a conventional cellular network voice call. Similarly, audio signals from network 16 may be provided from transceiver 52 to cordless radio transceiver 56, and thus to individual audio stations 32. In this way, one or two way voice calls from monitoring center 14 may be bridged to radio channels to audio stations 32 at audio station network interface 30 (i.e. from network 16 to audio station network interface 30, to cordless radio transceiver 56, to radio transceiver 46 of each audio station 32). In this way, monitoring center 14 may establish a uni- or bi-directional audio channel with premises 10.

In operation, sensors 18 and panel 20 interact in a conventional manner. As a particular sensor 18 is tripped signifying a sensed condition, the sensor provides a signal, wirelessly or through wired interconnect, to panel 20. Panel 20, in turn, places a network communication, typically in the form of a call, to a pre-programmed telephone number to contact monitoring center 14, typically by way of PSTN 12.

In order to ensure that panel 20 has unfettered access to PSTN 12, the wired telephone feed, providing telephone signals to the remainder of premises 10, may be routed through panel 20. This feed may be selectively disconnected from PSTN 12 by for example, a relay or the like, as panel 20 originates a call.

Software controlling the operation of central processor 32, and hence panel 20, may be embedded in processor 32 or may be stored in memory 24 external to processor 32. This software may be conventional, and may control overall operation of panel 20, including its interaction with sensors 18 and/or a control panel, for access and control. More specifically, the software causes alarm panel 20, through interface 28 to place one or more outgoing telephone calls after detection of an alarm event. Prior to placing the outgoing call, interface 28 may disconnect telephone feed 22 from PSTN 12. Typically, the alarm event represents the tripping of one of sensors 18 when alarm panel 20 is in its armed state.

The outgoing telephone call or calls may be placed to monitoring center 14, or any other alternate number (such as a subscriber number) by dialing a stored PSTN telephone number. The PSTN telephone number(s) to be called (e.g. the number of monitoring center 14) may be pre-programmed by an administrator of panel 20, and also stored within memory 24. Different sensed conditions may be associated with different PSTN number(s), thereby allowing different sensed conditions to be signaled to different monitoring stations, alternate numbers, or the like.

Once a pre-programmed number has been called, processor 34 generates a suitable message to the recipient. For example, if the called numbed is a monitoring center (such as monitoring center 14), data representative of the sensed alarm may be generated, encapsulated, and passed to monitoring center 14. The data, for example, may be encapsulated using any one of a number of modulation techniques. For example, the data may be passed to the monitoring center as a series of dual-tone, muli-frequency ("DTMF") tones using, for example, the SIA Protocol (as specified in the ANSI SIA DC-03-1990.01 Standard, the contents of which are hereby incorporated by reference), the ContactID Protocol, or as modulated data, modulated as pulses, or on a carrier frequency. If the number called is a subscriber number, processor 34 may generate a voice message to be heard by the subscriber.

Once an alarm has been signaled, monitoring center 14 may dispatch personnel or the police to premises 10. Data stored at monitoring center may identify the address of premises 10. Monitoring center 14 may further place a call to one or more designated telephone numbers (also stored at monitoring center 14) to notify the owner of premises 10 (or his/her designee) of the sensed alarm condition.

Additionally, and in manners, exemplary of embodiments of the present invention, monitoring center 14 may initiate a cellular network call over cellular network 16 to audio station 32 by way of audio station network interface 30 of the alarm system at premises 10 that has signaled the alarm. Again, the cellular network address of audio station network interface 30 may be stored at monitoring center 14. Prior to establishing the call (or thereafter) monitoring center 14 may further provide data to interface 30 to control radio transceiver 56, to selectively communicate with ones of audio station(s) 32, causing selected audio stations 32 to establish a radio channel with interface 30, which may be bridged by audio station network interface 30 to monitoring center 14. As noted, the radio channels may be uni- or bi-directional with speaker 42 and microphone 44. Thus, at premises 10, a one or two way voice channel between selected ones of audio interfaces 32 and monitoring center 14 may be established, by way of audio station network interface.

Conveniently, monitoring center 14 may thus communicate with a resident at premise 10, or with an intruder at the premises through audio station(s) 32. The resident/or intruders voice may be heard and recorded at monitoring center 14. As well, specific questions may be asked of the resident and/or intruder, and voice warnings may be given.

Optionally, an occupant at premises 10 could initiate voice communication with center 14, simply by actuating a switch 38 at any of any of audio station(s) 32. Audio station 32, in turn, signals audio station network interface 30 to establish a radio channel with the interface originating the signal. Control logic 54 may be sufficiently programmable to cause audio station network interface 30 to establish an outgoing cellular network call to a pre-determined number, identifying monitoring center 14. Once the call has been placed, the radio channel to the audio station 32 and the call may be bridged at interface 40, allowing the occupant to establish voice communication with monitoring center 14. Prior to bridging the radio channel, data identifying the origin of the call may be provided to monitoring center 14.

Conveniently, audio station interface 30 and audio stations 32 need not be physically interconnected with panel 20. They may thus be added to an already existing alarm system at premises 10. In this way, the existing alarm system need not be re-wired, or replaced. Further, as network to audio station interface 30 uses cellular network 16, a voice connection between monitoring center 14 and audio station(s) 32 may be initiated at center 14, or at audio stations 32, and need not tie-up PSTN 12, allowing an occupant to make an outgoing telephone call over PSTN 12, after the alarm has been signaled.

In alternate embodiments, audio station interface 30 may be integrated with, or interconnected to panel 20. Upon sensing an alarm condition, panel 20 may signal audio station interface 30 to initiate a call to monitoring center 14 and activate one or more of audio stations 32.

In another embodiment, audio station 32 may be integrated with the alarm panel 20. A further audio station interface 30 may be remote from panel 20. Audio station 32 may communicate with audio station interface 30 as described above, or with PSTN 12 network interface 28 of panel 20, to establish voice communication over PSTN 12. Upon sensing an alarm condition, alarm panel 20 may choose to communicate the alarm condition to monitoring center 14 via the PSTN connected to panel 14, or through the audio station interface 30, by way of radio transceiver 32 in audio station 32 at panel 20. Monitoring center 14 may then choose to initiate audio communication via PSTN, by placing a call to audio station interface 30.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. A method of processing an alarm at a premises, the method comprising:

sensing said alarm at a premises;

signalling said alarm from said premises to a monitoring center using a first network interface under control of a processor;

from the monitoring center, and in response to said signalling, initiating a cellular network call to a cellular network address identifying an audio station to network interface at the premises, said audio station to network interface comprising a second network interface, a radio, and control logic which operates independently of said processor;

using said control logic and said radio to establish a radio channel from said audio station to network interface to a selected one of a plurality of audio stations at the premises, said selected one of said plurality of audio stations comprising at least one of a speaker and a microphone, and a radio interface; and using said control logic to bridge said radio channel to said cellular network call to establish an audio channel from said selected one of said plurality of audio stations to said monitoring center.

2. The method of claim 1, further comprising providing a control signal from said monitoring center to said audio station to network interface to activate said at least one audio station using said control logic.

3. The method of claim 1, wherein said cellular network comprises a GSM network.

4. The method of claim 2, wherein said control signal comprises a GPRS data signal.

5. An alarm system at a monitored premises, comprising:
a first network interface comprising a processor for communicating a sensed monitored alarm condition at the monitored premises to a monitoring station;
a plurality of sensors in communication with said processor, each of said sensors for sensing a monitored alarm condition;
a plurality of audio stations, each of said audio stations comprising at least one of a speaker and a microphone, and a radio transceiver;
an audio station to network interface comprising (i) control logic which operates independently of said processor; (ii) a radio for communicating with a cellular communications network; and (iii) a radio transceiver for establishing a radio channel with at least one of said plurality of audio stations, said control logic interconnecting said radio transceiver and said radio to bridge said radio channel to a call over said cellular communications network;
wherein said control logic activates a selected one of said plurality of audio stations in response to commands received over said cellular communications network.

6. The alarm system of claim 5, wherein said audio station to network interface is operable to receive cellular network calls over said cellular communications network.

7. The alarm system of claim 6, wherein said radio transceiver of each of said plurality of audio stations comprises a spread spectrum radio transceiver.

8. The alarm system of claim 6, wherein said radio comprises a GSM network radio.

9. An alarm system at a monitored premises comprising:
means for sensing said alarm at a premises;
a first network interface;
a second network interface;
processing means for signalling said alarm from said premises to a monitoring center using said first network interface;
control means for receiving a cellular network call from the monitoring center using said second network interface, wherein said control means operates independently of said processing means;
wherein said control means and said second network interface form part of an audio station to network interface, at the premises;
wherein said control means is adapted to establish a radio channel from said audio station to network interface to a selected one of a plurality of audio stations at the premises, said selected one of said plurality of audio stations comprising at least one of a speaker and a microphone, and a radio interface, and
means for bridging said radio channel to said cellular network call to establish an audio channel from said selected one of said plurality of audio stations to said monitoring center.

10. A method of retrofitting an existing alarm system at a premises equipped with a network interface for communicating an alarm condition at the premises to a monitoring center, said method comprising:
installing at the premises, a plurality of audio stations, each comprising at least one of a speaker and a microphone, and a radio transceiver;
installing at the premises, an audio station to network interface comprising control logic; a radio for communicating with a cellular communications network; and a radio transceiver for establishing a radio channel with at least one of said audio stations, said control logic interconnecting said radio transceiver and said radio to bridge said radio channel to a call over said cellular communications network to a selected one of said plurality of audio stations;
updating existing data stored at said monitoring center to associate a network identifier identifying said audio station to network interface with said existing alarm system so that, in response to an alarm condition at the premises, said monitoring center is capable of initiating a cellular network call to said audio station to network interface that may be bridged by said control logic to establish an audio channel from said at least one audio station to said monitoring center.

\* \* \* \* \*